H. E. HARRIS.
DIE AND PROCESS FOR THE MANUFACTURE OF SPIKES.
APPLICATION FILED MAR. 25, 1920. RENEWED AUG. 2, 1921.
1,408,882.
Patented Mar. 7, 1922.
2 SHEETS—SHEET 1.
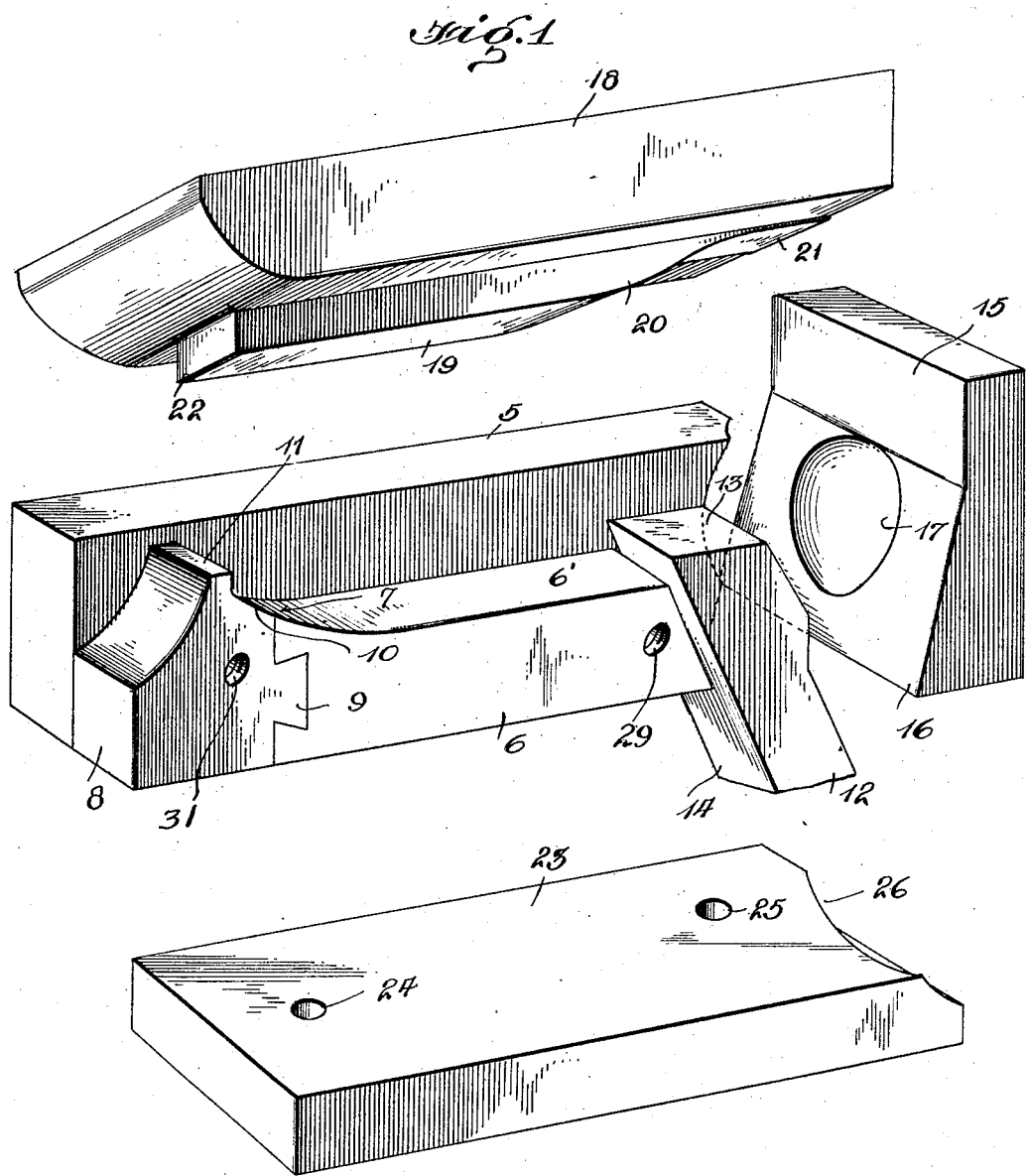
INVENTOR.
H. E. Harris
BY
ATTORNEYS.

H. E. HARRIS.
DIE AND PROCESS FOR THE MANUFACTURE OF SPIKES.
APPLICATION FILED MAR. 25, 1920. RENEWED AUG. 2, 1921.
1,408,882.
Patented Mar. 7, 1922.
2 SHEETS—SHEET 2.
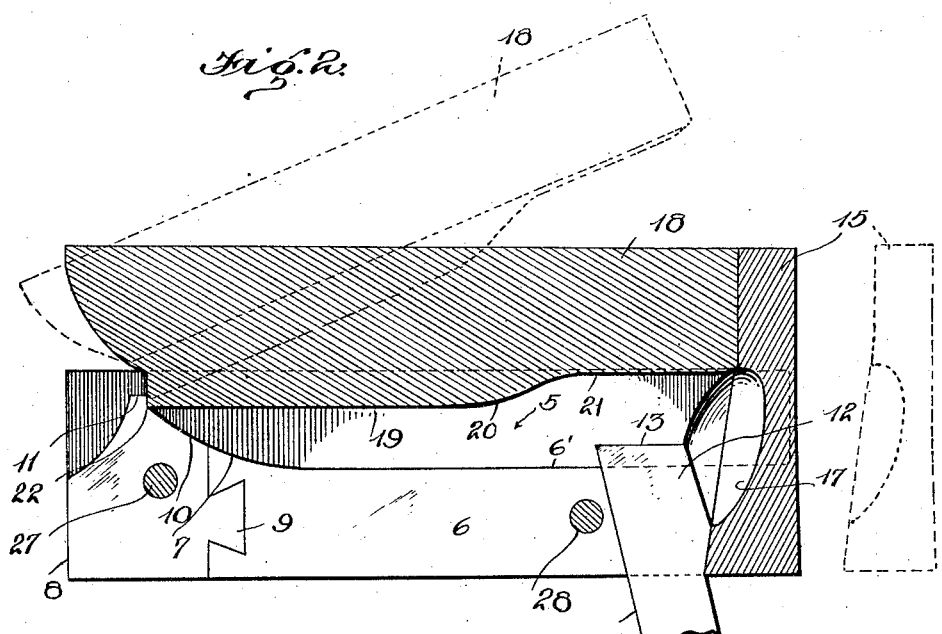
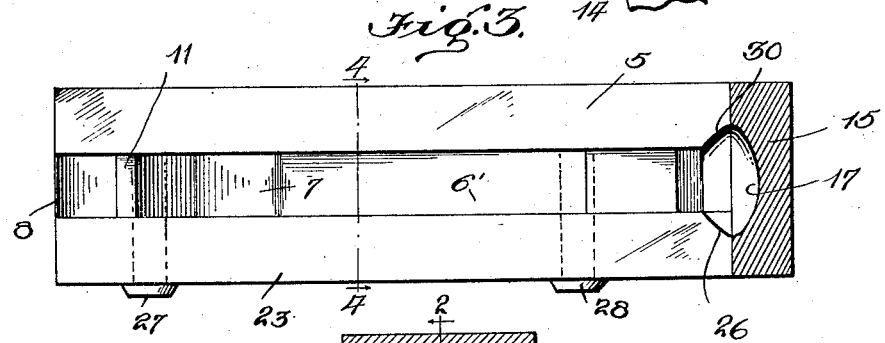
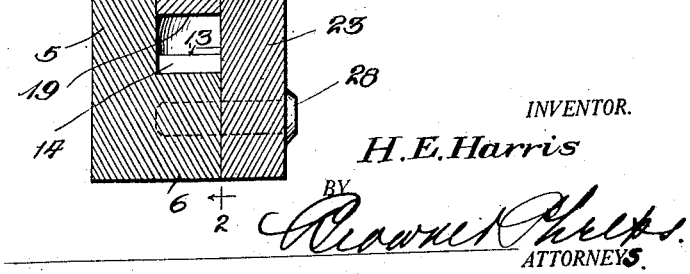
INVENTOR.
H. E. Harris
BY
ATTORNEYS.

UNITED STATES PATENT OFFICE.

HUBERT E. HARRIS, OF ATLANTA, GEORGIA, ASSIGNOR TO RAILWAY LOCK-SPIKE COMPANY, OF ATLANTA, GEORGIA.

DIE AND PROCESS FOR THE MANUFACTURE OF SPIKES.

1,408,882. Specification of Letters Patent. Patented Mar. 7, 1922.

Application filed March 25, 1920, Serial No. 368,620. Renewed August 2, 1921. Serial No. 489,201.

*To all whom it may concern:*

Be it known that I, HUBERT E. HARRIS, a citizen of the United States, residing at Atlanta, in the county of Fulton and State of Georgia, have invented certain new and useful Improvements in Dies and Processes for the Manufacture of Spikes, of which the following is a specification.

My invention relates to certain improvements in the manufacture of spikes such as are employed in securing the rails of railway tracks, with particular reference to the form of spike shown in Patent No. 1,203,541, issued to me October 31, 1916. To this end my invention consists in the features of construction, combination of parts and in the unique relations of the members and in the relative proportioning and disposition thereof, all as more completely outlined herein.

In the accompanying drawings in which there is illustrated the preferred embodiment of my invention.

Fig. 1 is a view showing the spike-forming die elements in separated relation;

Fig. 2 is a side elevation partly in section;

Fig. 3 a plan view with the upper die member removed; and a portion of the head upsetting member in section, and Fig. 4 a transverse section on the line 4—4 of Fig. 3.

Like reference numerals denote similar parts wherever they occur.

5 designates a side wall of a lower die member provided with a cut out portion 30 and having on its inner face an integral lower portion 6, the upper face 6' of which is curved adjacent its outer end as at 7.

8 is an end member connected at its front end with the part 7 by a dovetail 9, and having a curved portion 10 forming a continuation of the curved end 7 of the part 6, and with a shearing edge 11 for a purpose to be hereinafter explained, a bolt hole 19 being provided as shown.

Beyond the forward end of the part 6 and extending above the same and at an angle thereto is a member 12 having an upper metal engaging face 13 and a side portion 14 co-acting with the forward end of the member 6. A head upsetting member 15 provided on its inner face 16 with a head-forming recess 17 is so located as to close the forward end of the die when the several members are assembled.

18 is the upper die support provided on its under surface with a blank-engaging die member 19 inclined at its forward end as at 20, and terminating in a relatively lower portion 21. The rear end of the die member 19 is formed as a cutting or shearing edge 22 coacting with the edge 11 of the member 8 during the spike forming operation. 23 is the removable side wall of the die structure complementing the opposite side wall member 5 when the parts are in assembled relation, and is provided with bolt holes 24, 25, and a cut-out portion 26 coacting with the head-forming recess 17.

The members 5, 6, 8 and 23 are adapted to be secured together by suitable bolts 27—28 through the bolt holes 24—31 and 25—29, as shown in the drawings.

The support 18, as shown in Fig. 2, is adapted to be pivotally operated with reference to the members 5, 6, 8 and 18, and to gradually approach the same with a downwardly inclined forward movement, the die member 19 thereof seating between the side members 5 and 23 in the continued downward movement of said support.

In the operation of my improved means for manufacturing spikes the heated bar or blank from which the spikes are formed is fed into the dies and the upper die support 18 is caused to be operated by suitable means, not shown, the rear edge portion of the member 18 in the downward movement of said member cutting or shearing off by means of its edge 22, a suitable length of the bar by contact with the edge 11 of the member 8. The continued downward movement of the member 18 between the members 5 and 23 compresses the bar into the peculiar form of spike shown, the forward tapered portion 21 of the die member 19 leaving a recess wherein is formed the thickened portion or enlargement of the spike adjacent its head. The member 12 extends as shown above the face 6' of the member 6, and the metal of the bar is pressed about the same and downwardly below the inner edge portion formed by the meeting edges of the faces 13 and 14, thus forming a recess in the front face of the completed spike and which is adapted to receive the edge of the tie plate shown in my patent referred to, or the edge of the flange of a railway rail.

The head-forming member 15 is pressed inwardly against the forward or head end of the spike blank upsetting said end into the cavity 17 and the cut-out portions 26 and 30, thus forming a head thereon, the metal being pressed into the recess 17 shown on the inner face 16 of said head-forming member 15 and laterally into the recesses 26 formed on the member 23 and 30 on the member 5 respectively.

In order to more perfectly form the recess beneath the head of the spike the member 12 is advanced with the member 15 nearer to the end of the member 6 as the compression proceeds, whereby the member 12 is forced into the metal of the blank and the required plate edge receiving recess is formed by the face 13 of said member 12, and the other face 14 of said member.

The member 8 being removably connected to the member 6 can be readily removed therefrom for grinding its shearing edge 11, should the same become dulled in continued operation.

While the spike forming dies shown are peculiarly adapted to the making of spikes of the form shown in my patent herein referred to, yet it is obvious that the same can be employed for making spikes of other shapes or forms without material changes.

It will thus be seen that my improved spike forming dies constitute comparatively few parts and will rapidly and efficiently perform the function for which they are designed.

Considerable variation of the details as described herein may be resorted to without departure from the spirit of the invention which is to be construed in the light of the following claims.

Having thus described my invention what I claim as new and desire to secure by Letters Patent is:

1. A die comprising a plurality of separable members forming a mold wherein to compress a blank into spike form, said members having coacting cavities, one of said members being adapted to be forced against the end of the metal to cause the same to be expanded into said cavities to form the head of the spike, and a member extending into the molding space and above the plane of the floor thereof to cause the metal to press about the same whereby a notch or recess is formed in the completed spike adjacent its head.

2. A die comprising a plurality of members forming a mold wherein to compress a blank into spike form, said members having coacting cavities, one of said members having a rib portion extending part way of its length to form a thickened end of the spike, the coacting ends of a pair of said members having cutting edges adapted to sever the blank into proper lengths when brought together, and an end member having a cavity and adapted to be pressed against the end of the blank and to cause the same to be expanded into said cavities to form the head of the spike.

3. A die comprising a plurality of members forming a mold wherein to compress a blank into spike form, and a member extending into the molding space and above the plane of the floor thereof to cause the metal to press about the same whereby a notch or recess is formed in the completed spike adjacent its head.

4. A die comprising members shaped to form sides and bottom of a spike forming space, said bottom curving upwardly to give shape to a point of a spike formed in said space, a cutting edge at the termination of said upward curve, a die member adapted to pass between said sides and having a cutting edge thereon, a die member having a head forming recess and means movable within said space and above the bottom thereof to form a notch in a spike adjacent the head thereof.

5. A die comprising plates adapted when pressed together to enclose a space at bottom, sides and one end, a die member adapted to pass between said sides to enclose the top of said space and to press material therein to the form of the space, coacting cutting edges on one end of the bottom die and on one end of the top die, means to form a head on material in said space and means movable within the space and above the bottom thereof to form a notch on the formed material adjacent the head.

6. The process of forging which comprises enclosing a space and providing a cutting edge at one end thereof, moving a pressing member having a cutting edge thereon toward said space and in angular relation thereto until said cutting edges shear material into said space, rocking said pressing member about an axis passing through the cutting edges to progressively press material in said space with flow of material away from said cutting edges, and forming a head on the pressed material.

7. The process of die forging railway spikes which comprises partially shaping the spike by means of dies, moving a die against the metal of the partially completed spike to produce a notch with a sharp edge adjacent the head end of the spike while held by said shaping dies and forming a head upon the spike.

In testimony whereof I affix my signature in the presence of two witnesses.

HUBERT E. HARRIS

Witnesses:
SAMUEL MARTIN, Jr.,
W. R. HUTCHINSON.